United States Patent [19]

Mize

[11] 4,336,724
[45] Jun. 29, 1982

[54] VARIABLE SPEED TRANSMISSION

[76] Inventor: Pete Mize, Rte. 3, Comanche, Tex. 76442

[21] Appl. No.: 154,001

[22] Filed: May 28, 1980

[51] Int. Cl.³ .................. F16H 3/44; F16H 57/10
[52] U.S. Cl. ......................... 74/750 R; 74/772; 74/777
[58] Field of Search ............ 74/750 R, 772, 777, 74/793

[56] References Cited

U.S. PATENT DOCUMENTS

| | | | |
|---|---|---|---|
| 787,423 | 4/1905 | Woodworth | 74/194 |
| 1,081,954 | 12/1913 | Green | 74/194 |
| 1,174,064 | 3/1916 | Gordon | 74/194 |
| 1,274,627 | 8/1918 | Thompson | 74/777 |
| 1,640,882 | 8/1927 | Clark | 74/777 |
| 1,736,932 | 11/1929 | Meynier | 74/777 |
| 2,478,227 | 8/1949 | Bannister | 74/772 |
| 3,220,284 | 11/1965 | Horvath | 74/710.5 X |
| 3,394,620 | 7/1968 | Tormolen | 74/773 X |
| 3,429,394 | 2/1969 | Jacono | 74/710.5 X |
| 3,631,730 | 1/1972 | Hadler et al. | 74/194 |

Primary Examiner—Lawrence J. Staab
Attorney, Agent, or Firm—Wendell Coffee

[57] ABSTRACT

A variable speed transmission is provided with a coaxial input and output shaft. Bevel gear on the output shaft has meshed thereto pinions carried on a journalled cross shaft on the input shaft. The degree at which the pinions are driven or idle depend upon a leverage arrangement including a rim disc attached to the pinions.

9 Claims, 4 Drawing Figures

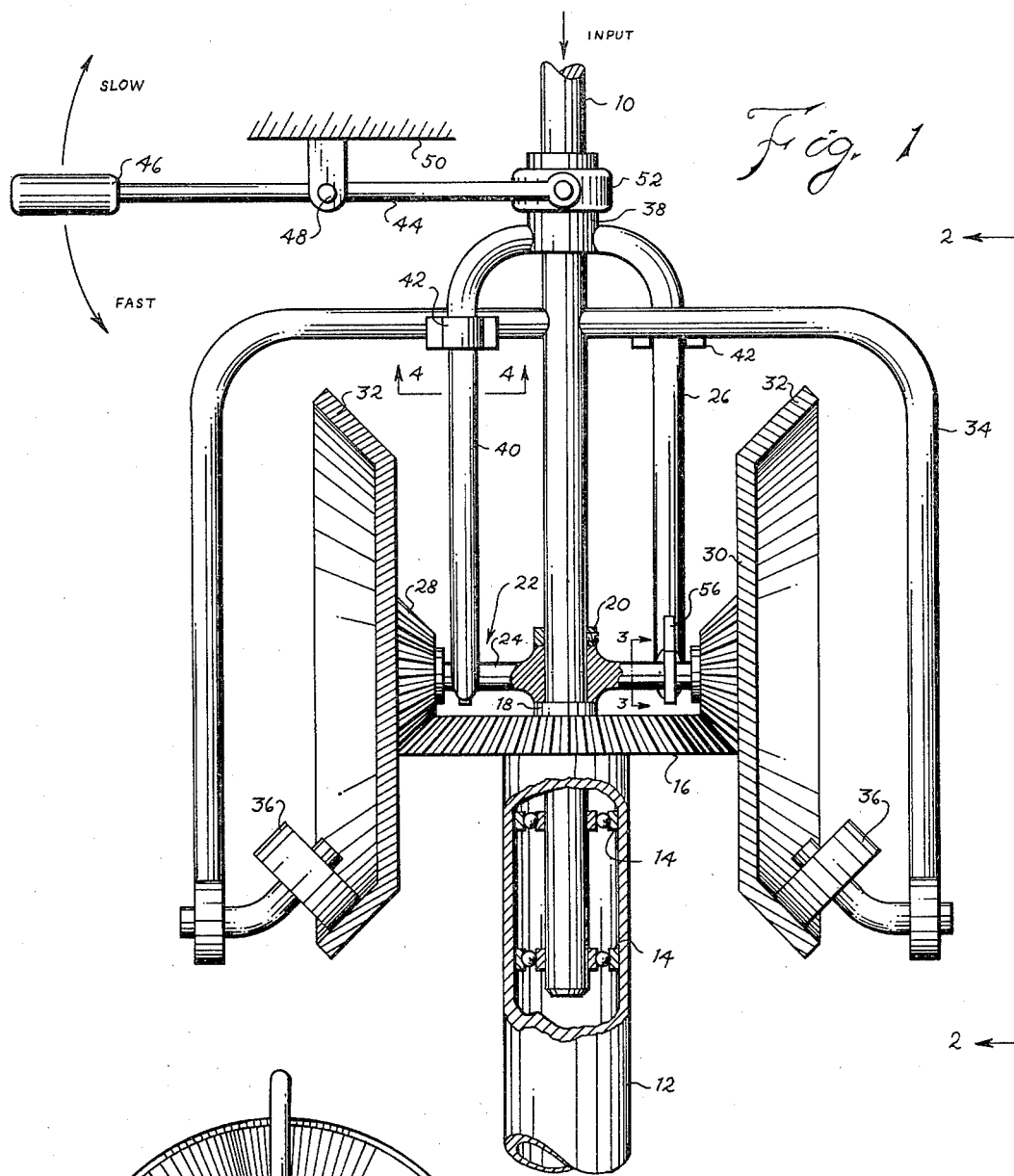
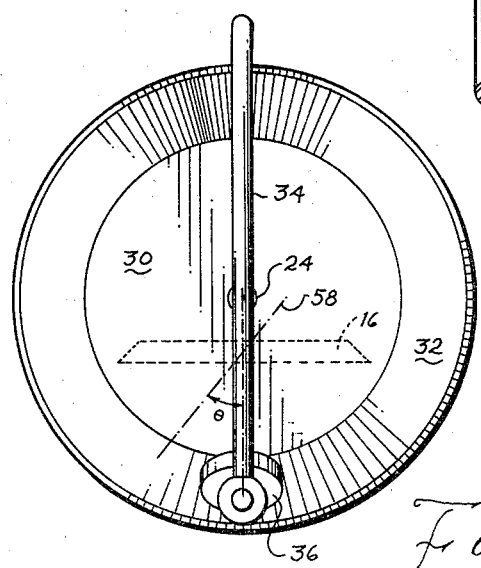
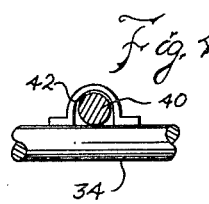
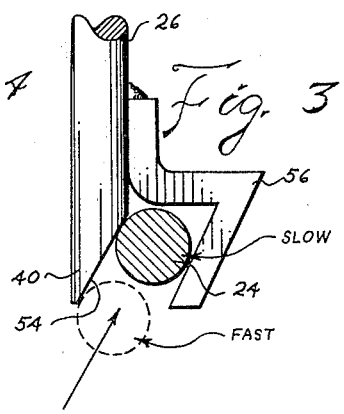

VARIABLE SPEED TRANSMISSION

CROSS REFERENCE TO RELATED APPLICATIONS

None, however, applicant has filed Disclosure Document Ser. No. 085,568 on Nov. 5, 1979 and previous to that had filed Disclosure Document Ser. No. 069,756 on Mar. 24, 1978, which documents concern this application; therefore, by separate paper it is respectfully requested that each of the documents be retained and acknowledgement thereof be made. (MoPEP 1706)

BACKGROUND OF THE INVENTION (1) Field of the Invention

This invention relates to gearing and more particularly to a differential type gear transmission having plural power paths from its input to output, to achieve a variable speed transmission.

(2) Description of the Prior Art

Variable speed transmissions have been a perplexing problem of machine elements. By variable speed transmission in this context it is meant a machine element that will transmit power from one rotating shaft to another at varying ratios of speed between the two shafts. Specifically, excluded from this are the choice of different speeds such as where the speed ratio is chosen between different steps regardless of how many steps are included.

In commercial use today the main variable speed transmissions are by V-belt drives where the effective sheave diameter of one or both sheaves are changed.

However, an effective commercial transmission which transmits power through toothed gears with variable speed has not been achieved. There has been suggested that a planetary gear could be used wherein one of the gears is braked rather than either permitted to run free or being locked in a fixed position. Such a system, to some degree, will achieve a variable speed transmission. However, it is at the sacrifice of being inefficient in the loss of energy in the brake.

Before this application was filed, a search was made in the U.S. Patent and Trademark Office and the following patents were found in this search.

Jacono U.S. Pat. No. 3,429,394
Tormolen U.S. Pat. No. 3,394,620
Horvath U.S. Pat. No. 3,220,284
Thompson U.S. Pat. No. 1,274,627

According to the applicant's understanding of these patents that Thompson, Jacono and Horvath are primarily concerned with the braking type speed control. The Tormolen also embodies a planetary gear system wherein the housing moves axially along the input and output shafts. The position of the housing controls the settings and different parts and, therefore, controls different speeds.

SUMMARY OF THE INVENTION (1) New and Different Function

I have invented a variable speed transmission which uses a gear and more particularly a beveled gear which has the power transmitted at different radius arms and, therefore, since the power is transmitted from different radius arm lengths have different effective diameters. Having different effective diameters, according to how much power is transmitted from which point will effect the changed speed ratio, which is to say effects the different variable speed which will in effect produce a variable speed transmission.

Also, since the transmission is not based upon any braking principle or wasted energy principle the transmission will have an efficiency which is comparitable to, if not equal to, any other gear transmission.

Thus, it may be seen that the total function of my combination far exceeds the sum of the function of the individual pinions, gears, rollers, etc.

(2) Objects of this Invention

An object of this invention is to transmit power from one rotating shaft to another with variable speed ratio as between the input and output shafts.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a side elevational view with some parts in section or broken away for clarity of illustration.

FIG. 2 is a partial side elevational view as would be seen at line 2—2 and is also a partial end view.

FIG. 3 is a sectional view taken substantially on line 3—3 of FIG. 1.

FIG. 4 is a sectional view taken substantially on line 4—4 of FIG. 1.

DESCRIPTION OF THE PREFERRED EMBODIMENT

As seen in the drawings, the mechanism is to transmit energy from input shaft 10 to output shaft 12. The output shaft is coaxial with the input shaft. The output shaft 12 is of tubular structure and is journalled by bearings 14 to the input shaft 10. Those having ordinary skill in the art will understand that both the output shaft and input shaft would be supported by bearings not shown in a housing or upon a support structure or framework 50. Also, to have utility there would be some power input to drive input shaft and some tool or mechanism to use the power produced by the output shaft 12. However, for clarity of the illustrations, the housing, frames, external power, bearings, power source and power usage have not been illustrated in the drawings.

Bevel gear 16 is rigidly fixed to the output shaft 12 on the end thereof. The bevel gear is coaxial with the output shaft and, therefore, also coaxial with the input shaft 10. The axial relationship between the output shaft and input shaft is fixed. It may be seen that the upward movement (as illustrated) of the output shaft 12 is limited by collars 18 and 20. The collar 18 is fixed to the input shaft immediately above the bevel gear 16. The hub of the spider 22 carrying the cross shafts 24 is between collars 18 and 20. The collars 18 and 20 are conveniently attached to the input shaft 10 by set screws. The movement of output shaft 12 away from the collar 18 could be prevented by similar collar immediately below the bevel gear 16 which has not been shown in the drawing. The spider 22 is held in axial position upon the input shaft 10 by the collars 18 and 20. The spider 22 is journalled to the input shaft 10 so that it is free to have a certain angular movement about the input shaft. It would be free to completely rotate about the input shaft were it not limited in its movement by fork 26 as will be described later.

Pinions 28 are journalled for rotation upon the end of each of the cross shafts 24. As illustrated, there are two cross shafts 24 upon the spider and, therefore, two pinions. It will be understood by those having skill in the art that there could be either a single cross shaft and pinion or there could be multiple cross shafts and pinions. It is desirable to have the pinions evenly spaced around the input shaft 10 for balance and even power transmission. Although operable, a single cross shaft 24 and pinion 28 is not the preferred mode of construction.

Each of the pinions 28 is meshed with the bevel gear 16. By saying the pinion 28 is meshed with the bevel gear 16 it is meant that the teeth of the pinion are engaged with the teeth of the bevel gear.

Disc 30 is rigidly fixed to the pinion 28, coaxial therewith. Disc 30 has rim 32. As illustrated, the rim extends at a 45° angle from the disc 30. The rim could extend out normal to the disc 30. Bracket 34 is rigidly fixed to the input shaft 10. Rollers 36 are journalled to the bracket 34 and contact the rim 32 of the disc 30. Each roller contacts the disc 30 so that the bevel gear 16 is between the roller 36 and the axis of the pinion 28 which is to say the axis of the cross shaft 24.

The fork 26 is attached to the input shaft 10 by sleeve 38. The fork is attached to the input shaft 10 so that the fork 26 may be moved axially of the input shaft but not rotate thereon. This may be achieved by having a splined joint between the input shaft 10 and the sleeve 38. However, for construction purposes I have chosen to restrict rotational movements by sliding the legs 40 of the fork 26 through guides 42 rigidly fixed to the bracket 34. This arrangement is particularly illustrated in FIG. 4 of the drawing. The axial movement of the fork 26 is controlled by shift lever 44. As illustrated, the shift lever includes operating handle 46, mid-point fulcrum or pivot 48 which is fixed to some fixed object such as the housing or frame 50 and the end of the shift lever is fixed to ring 52 which encircles the input shaft 10 and bears against the sleeve 38. Therefore, it may be seen that movement of the handle 46 will move the ring 52 and, thus the sleeve 38. The ring 52 forms a part of means for moving the fork 26 axially of the input shaft 10.

The lower part of each of the legs 40 has an inclined plane 54 which bears against the cross shaft 24. Retainer 56 is attached to the bottom of each of the legs 40 to insure that the proper relationship between the cross shaft 24 and the inclined plane 54 is maintained.

OPERATION

When the fork 26 is in the down position, which is to say if the handle 46 is in the up or slow position it may be seen that the inclined plane 54 of the leg 40 of the fork 26 will be pushing against the cross shaft 24 of the spider 20. The pinions 28 will be pushed along at their axis. That is, the pinions 28 will be rotated relative to the bracket 34 because of the force applied to the cross shafts 24 which is at the axis of the pinions 28. In such a condition they will rotate freely upon the bevel gear 16 and there will be no power transmitted from the input shaft 10 to the output shaft 12. The output shaft 12 will not rotate if there is any load whatsoever upon it. Of course, those having skill in the mechanical arts will understand that if there is no load upon the output shaft 12 it might rotate or idle slowly.

However, if the fork 26 is raised by moving the handle 46 downward it may be seen that there will be a reduced amount of force or pressure transmitted to the cross shaft 24 and there will be an increased or positive amount of force transmitted to the disc 30 through its rim 32 by the rollers 36. This force upon the disc 30 will act as a lever arm with the pivot or fulcrum of the lever being the axis of the cross shaft 24 so that there will be a force upon the teeth of the pinion 28 to be transmitted to the bevel gear 16. Depending upon the amount of force at the point of contact between the rollers 36.

Also, it will be noted that the rollers 36 being journalled to the bracket 34 are free to rotate and the driving of the output shaft is not a result of braking and loss of energy. The output shaft is driven through this lever arm, this force upon the rim 32 of the disc 30. I called this "lever arm driving" inasmuch according to my analysis it can be analyzed on a lever basis most clearly. FIG. 2 particularly illustrates that as the fork 26 is raised there will be movement of the bracket 34. FIG. 2 shows this phantom lever arm as broken line 58. However, the analysis as might be illustrated in FIG. 2 would seem to illustrate that the bevel 16 is the pivot and the two points on the lever would be the roller 36 and the axis of the cross shaft 24.

Thus, it may be seen that I have provided for an efficient variable speed transmission.

As an aid to correlating the terms of the claims to the exemplary drawing, the following catalog of elements is provided:

10 input shaft
12 output shaft
14 bearing
16 bevel gear
18 collar
20 collar
22 spider
24 cross shafts
26 fork
28 pinion
30 disc
32 rim
34 bracket
36 roller
38 sleeve
40 legs
42 guides
44 lever, shift
46 handle
48 fulcrum
50 housing
52 ring
54 plane, inclined
56 retainer
58 phantom lever The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:

1. A variable speed transmission comprising in combination
   a. an input shaft,
   b. an output shaft coaxial with the input shaft,
   c. a bevel gear with teeth coaxial with and rigidly fixed to the output shaft,
   d. a cross shaft journalled to the input shaft,
   e. at least one pinion with teeth journalled on the cross shaft and having its teeth engaged with the gear teeth,
   f. a disc rigidly fixed to the pinion,
   g. a rim on the disc,
   h. a roller engaging the rim of the disc, so arranged and constructed that the gear is between the roller and pinion,
   i. a bracket rigidly fixed to the input shaft,
   j. said roller journalled to said bracket, and
   k. fork means attached to the input shaft for angularly moving the cross shaft on the input shaft.

2. The invention as defined in limitations a. through k. of claim 1 further comprising:
   l. said output shaft being tubular in construction and telescoped over said input shaft, and
   m. bearings between said output shaft and input shaft.

3. The invention as defined in limitations a. through k. of claim 1 further comprising:
   l. said rim on the disc being at about a 45° angle from the disc.

4. The invention as defined in limitations a. through k. of claim 1 wherein said fork means include
   l. at least one leg of a fork mounted for axial movement upon said input shaft but restrained from rotational movement on said input shaft,
   m. an inclined surface on said leg contacting said cross shaft to angularly move said cross shaft on the input shaft.

5. The invention as defined in limitations a. through k. of claim 1 wherein said cross shaft is in the form of
   l. a spider, and
   m. more than one pinion and disc as defined above are journalled to said cross shaft spider.

6. The invention as defined in limitations a. through m. of claim 5 wherein said fork means include
   n. at least one leg of a fork mounted for axial movement upon said input shaft but restrained from rotational movement on said input shaft,
   m. an inclined surface on said leg contacting said cross shaft to angularly move said cross shaft on the input shaft.

7. The invention as defined in limitations a. through o. of claim 6 further comprising:
   p. said rim on the disc being at about a 45° angle from the disc.

8. The invention as defined in limitations a. through p. of claim 7 further comprising:
   q. said output shaft being tubular in construction and telescoped over said input shaft, and
   r. bearings between said output shaft and input shaft.

9. A variable speed transmission comprising in combination
   a. an input shaft,
   b. a tubular output shaft telescoped coaxial over part of the input shaft,
   c. bearings between the input and output shafts,
   d. a bevel gear with teeth coaxial with and rigidly fixed to the output shaft,
   e. a spider journalled to the input shaft,
   f. two cross shafts on the spider,
   g. a pinion with teeth journalled on each of the cross shafts and having its teeth engaged with the gear teeth,
   h. a disc rigidly fixed to each of the pinions,
   i. a rim on the disc at about a 45° angle from the disc,
   j. a roller engaging the rim of each of the discs, so arranged and constructed that the gear is between the roller and pinion,
   k. a bracket rigidly fixed to the input shaft,
   l. said rollers journalled to said bracket, and
   m. a bifurcated fork mounted for movement on the input shaft,
   n. means on the input shaft for moving the fork axially of the input shaft,
   o. guides on the bracket through which legs of the fork pass,
   p. inclined planes on the end of the fork legs bearing against the cross shafts of the spider.

* * * * *